(12) United States Patent
Foss (10) Patent No.: US 9,421,951 B2
(45) Date of Patent: Aug. 23, 2016

(54) WIPER ASSEMBLY HAVING AN END CAP

(71) Applicant: TRICO PRODUCTS CORPORATION, Rochester Hills, MI (US)

(72) Inventor: John Foss, Troy, MI (US)

(73) Assignee: Trico Products Corporation, Rochester Hills, MI (US)

(*) Notice: Subject to any disclaimer, the term of this patent is extended or adjusted under 35 U.S.C. 154(b) by 106 days.

(21) Appl. No.: 14/289,902

(22) Filed: May 29, 2014

(65) Prior Publication Data
US 2015/0343997 A1 Dec. 3, 2015

(51) Int. Cl.
*B60S 1/38* (2006.01)

(52) U.S. Cl.
CPC ............ *B60S 1/3886* (2013.01); *B60S 1/38* (2013.01); *B60S 1/3889* (2013.01); *B60S 1/381* (2013.01); *B60S 1/3849* (2013.01); *B60S 1/3879* (2013.01); *B60S 2001/3836* (2013.01)

(58) Field of Classification Search
CPC .... B60S 1/3886; B60S 1/3889; B60S 1/3891; B60S 1/3894; B60S 1/3896; B60S 1/38; B60S 1/381; B60S 1/3879; B60S 1/3874
USPC ............ 15/250.43, 250.44, 250.201, 250.361
See application file for complete search history.

(56) References Cited

U.S. PATENT DOCUMENTS

| | | | |
|---|---|---|---|
| 8,020,246 B2 | 9/2011 | Bauer et al. | |
| 8,196,252 B2 | 6/2012 | Henin | |
| 8,307,494 B2 | 11/2012 | Boland | |
| 8,327,500 B2 | 12/2012 | De Block et al. | |
| 8,341,801 B2 | 1/2013 | Coos | |
| 8,402,593 B2 | 3/2013 | Boland | |
| 2007/0174989 A1 | 8/2007 | Moll et al. | |
| 2008/0222833 A1 | 9/2008 | Henin et al. | |
| 2008/0313843 A1 | 12/2008 | Chou | |
| 2010/0037417 A1 | 2/2010 | Moll et al. | |
| 2010/0139026 A1 | 6/2010 | Ku | |
| 2010/0257687 A1 | 10/2010 | Huang | |

(Continued)

FOREIGN PATENT DOCUMENTS

| | | |
|---|---|---|
| WO | 2007122569 A2 | 11/2007 |
| WO | 2009115408 A1 | 9/2009 |
| WO | 2013087109 A1 | 6/2013 |

OTHER PUBLICATIONS

International Search Report and Written Opinion of the International Searching Authority for PCT International Application No. PCT/US2015/032889 mailed Sep. 3, 2015.

*Primary Examiner* — Gary Graham (57) ABSTRACT

The present invention relates a wiper assembly having an elongated wiping element, a pair of elongated splines, and a pair of end caps. The wiping element has a head portion and a wiping portion. The splines support the wiping element and each has opposing longitudinal ends, lateral sides, top and bottom surfaces, a first pair of notches disposed at the longitudinal ends, and a second pair of notches disposed along the lateral sides spaced from the end. The end caps are mounted to the ends and have a body defined by a shell extending from a distal surface, a pair of lower shelves extending from the surface facing each other, a valley between the shelves, mounts extending from the surface and engaging the first notches, and resilient tabs extending from the mounts and having hook sections disposed within each of the second notches of the splines.

17 Claims, 7 Drawing Sheets

(56) References Cited

U.S. PATENT DOCUMENTS

2010/0319154 A1* 12/2010 Bousset ............... B60S 1/3889
                                                    15/250.48
2012/0124767 A1   5/2012  Thielen et al.
2012/0297567 A1  11/2012  Hyer
2014/0137358 A1   5/2014  Bex et al.

* cited by examiner

WIPER ASSEMBLY HAVING AN END CAP

BACKGROUND OF THE INVENTION

1. Field of the Invention

The present invention relates generally to wiper systems, and more specifically, to a wiper assembly having an end cap.

2. Description of the Related Art

Conventional automotive wiper systems known in the art include some type of wiper assembly (sometimes referred to as a wiper blade) mounted to a wiper arm which, in turn, is mounted adjacent to a surface to be wiped, such as a windshield of a vehicle, and pivotally driven to impart reciprocal motion to the wiper assembly across the windshield. The wiper assembly typically includes a rubber wiping element that contacts the windshield across the surface to be wiped. The wiper assembly often incorporates one or more metal strips that act to reinforce the wiping element and facilitate wiping contact by the wiping element across what is typically a curved glass surface. The wiper assembly also typically includes a coupler that attaches to and supports the one or more metal strips, and an adapter attached to the coupler. The adapter allows the wiper assembly to be releasably attached to the wiper arm. In this context, the wiper arm delivers a downward force to the wiper assembly that is distributed thereacross, pressing the wiper assembly into contact with the windshield. The wiper assembly also typically includes an airfoil that attaches to the metal strips, and a pair of end caps located at distal ends of the wiper assembly. The airfoil is often formed from plastic or rubber and is used to prevent the wiper assembly from lifting off the windshield. The end caps are typically used to prevent the airfoil from sliding off the metal strips in operation.

Each of the components of a wiper assembly of the type described above must cooperate to effectively clean a surface to be wiped. In addition, each of the components must be designed not only to facilitate an improved wipe quality, but also so as to reduce the cost and complexity of assembling the wiper assembly.

While wiper assemblies known in the related art have generally performed well for their intended purpose, there remains a need in the art for a wiper system that has superior operational characteristics, reduces the cost of manufacturing the assembly, and provides increased aesthetic value.

SUMMARY OF THE INVENTION

The present invention overcomes the disadvantages in the related art in a wiper assembly having an elongated wiping element, a pair of elongated splines, and a pair of end caps. The elongated wiping element is adapted to contact the surface to be wiped and has a head portion and a wiping portion. The elongated splines support the elongated wiping element and each of the splines has opposing longitudinal ends, opposing lateral sides, and opposing top and bottom surfaces. Further, each of the elongated splines includes a first pair of notches disposed at each of the opposing longitudinal ends, as well as a second pair of notches disposed along one of the opposing lateral sides spaced from each opposing longitudinal end. The end caps are operatively mounted to each of the opposing longitudinal ends. The end caps have a body defined by a shell extending from a distal surface, a pair of lower shelves extending from the distal surface and facing each other, a valley defined between the shelves, a pair of mounts extending from the distal surface and engaging the first pair of notches, and a pair of resilient tabs extending from the mounts and having hook sections, with the hook sections being disposed within each of the second pair of notches of the pair of elongated splines.

In addition, the present invention is directed toward a wiper assembly having an elongated wiping element, a pair of elongated splines, an airfoil, and a pair of end caps. The elongated wiping element is adapted to contact the surface to be wiped and has a head portion and a wiping portion. The elongated splines support the elongated wiping element and each of the splines has opposing longitudinal ends, opposing lateral sides, and opposing top and bottom surfaces. Further, each of the elongated splines includes a first pair of notches disposed at each of the opposing longitudinal ends, as well as a second pair of notches disposed along one of the opposing lateral sides spaced from each opposing longitudinal end. The airfoil is operatively attached to the elongated splines. The end caps are operatively mounted to each of the opposing longitudinal ends. The end caps have a body defined by a shell extending from a distal surface, a pair of lower shelves extending from the distal surface and facing each other, a valley defined between the shelves, a pair of mounts extending from the distal surface and engaging the first pair of notches, and a pair of resilient tabs extending from the mounts and having hook sections, with the hook sections being disposed within each of the second pair of notches of the pair of elongated splines.

In this way, the wiper assembly of the present invention effectively cleans a surface to be wiped and, at the same time, provides an increased aesthetic value. Further, the wiper assembly of the present invention provides advantages related to manufacturing and component assembly.

BRIEF DESCRIPTION OF THE DRAWINGS

Other objects, features, and advantages of the present invention will be readily appreciated as the same becomes better understood after reading the subsequent description taken in connection with the accompanying drawings wherein.

DETAILED DESCRIPTION OF THE INVENTION

Figure 1:
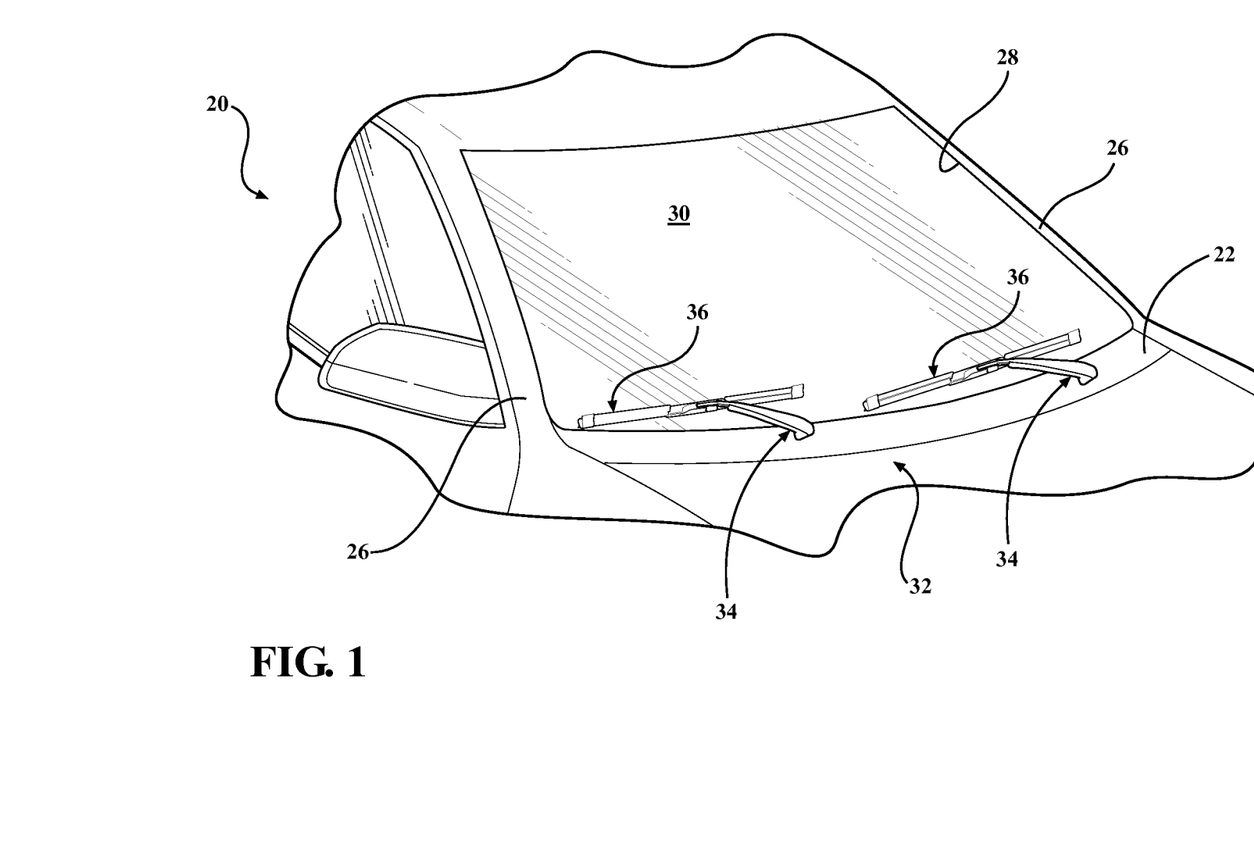
FIG. 1 is a partial perspective view of a front of a vehicle having a pair of wiper assemblies pivotally mounted for reciprocal movement across a windshield of the vehicle.

With reference to the Figures, where like numerals are used to designate like structure throughout the several views, a portion of a vehicle is schematically illustrated at 20 in FIG. 1. The vehicle 20 includes a cowl 22, a roof 24, and a pair of laterally spaced front A-pillars 26 extending between the roof 24 and the cowl 22. The A-pillars 26, roof 24, and cowl 22 cooperate to define a generally rectangular opening 28 in which a curved or "swept back" glass windshield 30 is supported. As illustrated, the vehicle 20 is an automobile, but could be any type of vehicle, such as a heavy-duty truck, train, airplane, ship, construction vehicle or equipment, military vehicle, or any other type of vehicle that contains surface wiper systems.

A wiper system is generally indicated at 32 in FIG. 1 and is employed to clean the windshield 30. The wiper system 32 includes a pair of wiper arms, generally indicated at 34, and a pair of wiper assemblies, generally indicated at 36, which correspond to the driver and passenger sides of the vehicle 20. However, those having ordinary skill in the art will appreciate that the wiper system 32 could employ a single wiper arm 34 and single wiper assembly 36, or more than two wiper arms 34 and more than two wiper assemblies 36, without departing from the scope of the present invention. In the representative example illustrated herein, each wiper assembly 36 is carried by a corresponding wiper arm 34. The wiper system 32 also includes an electric motor (not shown, but generally known in the art) to move the wiper assemblies 36 in an oscillating manner across the surface of the windshield 30.

While the wiper assembly 36 illustrated in FIG. 1 is shown in connection with the front windshield 30 of the vehicle 20, those having ordinary skill in the art will appreciate that wiper assemblies 36 could be used in other areas of the vehicle 20 that employ a wiper system 32, such as a rear window (not shown) or a head lamp (not shown). Thus, it will be understood that the present invention is not limited for use solely in connection with wiper arms 34 adapted for use on a vehicle's windshield 30, but for use in all applications where wiper systems 32 are employed.

Figure 2:
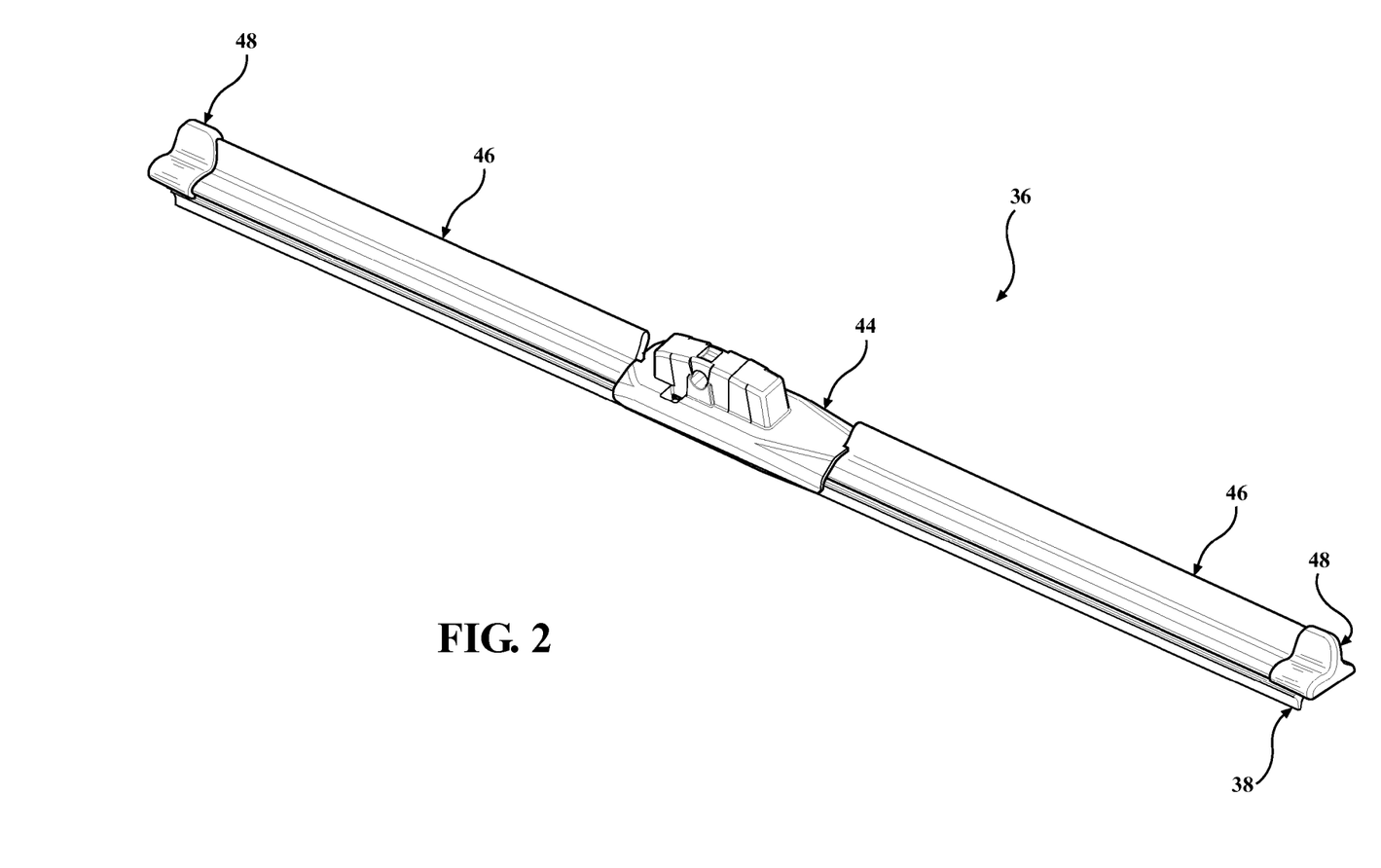
FIG. 2 is an enlarged perspective view of a wiper assembly according to one embodiment of the present invention.
Figure 3:
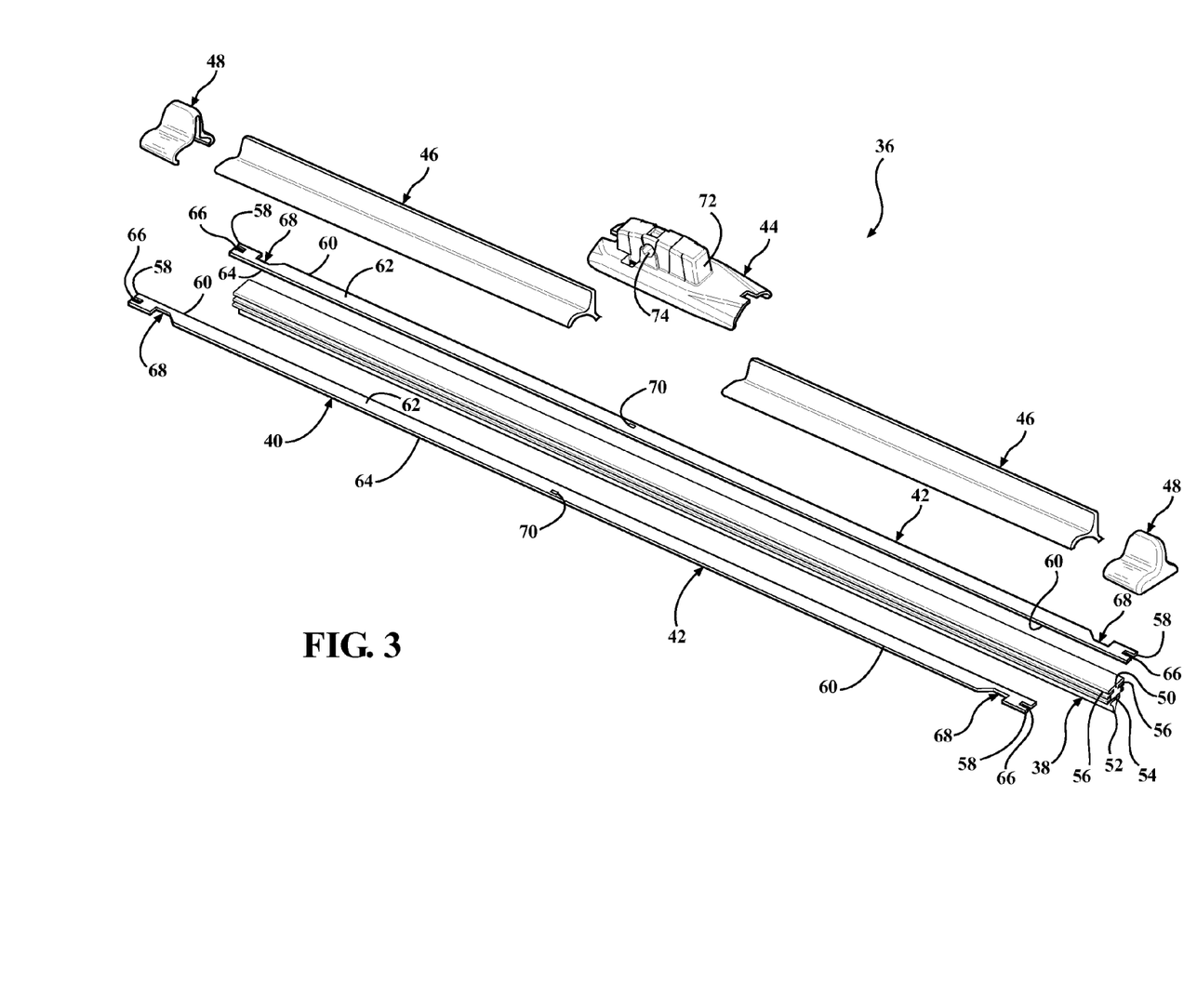
FIG. 3 is an exploded perspective view of the wiper assembly, according to one embodiment of the present invention, of FIG. 2.

Referring to FIGS. 2 and 3, the wiper assembly 36 includes a wiping element 38 that is adapted to contact a surface of the vehicle 20 to be wiped, in this representative example, the windshield 30. The wiper assembly 36 also includes at least one support member 40 that defines a longitudinal axis and that acts to reinforce or support the wiping element 38. In the representative embodiment illustrated herein, the support member 40 is a pair of splines 42 that operatively reinforce or support the wiping element 38. However, those having ordinary skill in the art will appreciate from the description that follows that the support member 40 may be either monolithic or defined by a pair of splines 42 without departing from the scope of the present invention. The wiper assembly 36 also includes a coupler 44 operatively attached to the support member 40. The coupler 44 is configured to attach to an adapter (not shown, but generally known in the art) which, in turn, is adapted to connect to the wiper arm 34. The wiper assembly 36 may also include an airfoil assembly, generally indicated at 46, to prevent the wiper assembly 36 from lifting away from the surface of the windshield 30. The wiper assembly 36 also includes a pair of end caps, generally indicated at 48, to prevent the airfoil assembly 36 from disengaging the splines 42. Each of the above components will be described in greater detail below.

The elongated wiping element 38 is adapted to contact the surface to be wiped, is configured to a predetermined length corresponding to a particular application, and is often manufactured through an extrusion process which enables the length of the wiping element 38 to be easily adjusted without a substantial increase in manufacturing expense. Furthermore, while the wiping element 38 of the present invention is constructed from a flexible rubber, those having ordinary skill in the art will appreciate that the wiping element 38 could be constructed from any flexible material, such as silicone or another polymer, without departing from the scope of the present invention. As shown best in FIG. 3, the wiping element 38 includes a head portion 50 and a wiping portion 52 partitioned by a longitudinally extending hinge portion 54. The hinge portion 54 provides flexibility between the head portion 50 and the wiping portion 52 during operational movement of the wiper assembly 36 across the surface to be wiped. The wiping portion 52 has a generally triangular, tapered profile. However, those having ordinary skill in the art will appreciate that the wiping portion 52 could have any suitable profile, shape, or configuration without departing from the scope of the present invention. The head portion 50 includes grooves 56 extending laterally therein and longitudinally therealong between its longitudinal ends. The grooves 56 receive the splines 42 of the support member 40 and cooperate with the splines 42 as will be described in detail below.

The wiper assembly 36 also includes at least one support member 40 extending between opposed longitudinal ends 58. The support member 40 is constructed from a resiliently flexible material, such as spring steel or a polymer, and is adapted to apply force from an intermediate position between the longitudinal ends 58. More specifically, the support member 40 receives force from the spring loaded wiper arm 34 at an intermediate position and distributes this force across the span of the support member 40 toward the longitudinal ends 58. To that end, the support member 40 may be curved longitudinally with a predetermined radius of curvature. In the related art, this predetermined radius of curvature is sometimes referred to as a "free form" radius of curvature. Accordingly, the curvature of the support member 40 may be symmetrical or asymmetrical, depending on the force requirements of the application and the contour of the windshield 30. The flexible, free form, pre-curved support member 40 straightens out when the wiper arm 34 applies a force thereto and directs the wiping element 38 to contact the windshield 30. Thus, the elongated support member 40 includes a free-form curvature that ensures force distribution on windshields having various curvatures and that effects proper wrapping about the windshield 30.

The support member 40 may have a substantially constant width and a constant thickness throughout its length between the longitudinal ends 58. The constant width and thickness are adapted to provide high lateral and torsional stiffness so as to avoid lateral and torsional deflections, which otherwise cause the wiping element 38 to stick/slip ("chatter") on the windshield 30 during operation. Thus, the cross-section of the support member 40 has a generally rectangular outer profile that makes the support member 40 easier to manufacture. More specifically, where the support member 40 is constructed from metal, such as spring steel, the tools and machinery used to manufacture the support member 40 are less complicated than those required to manufacture a support member 40 having varying width and/or thickness. Furthermore, where the support member 40 is constructed from a polymer, such as a thermoplastic elastomer, the manufacturing tools and extrusion process machinery are also less complicated than those employed to manufacture varying width and/or thicknesses. However, those having ordinary skill in the art will appreciate that the support member 40 could have a varying thickness and/or width without departing from the scope of the present invention.

Figure 6:
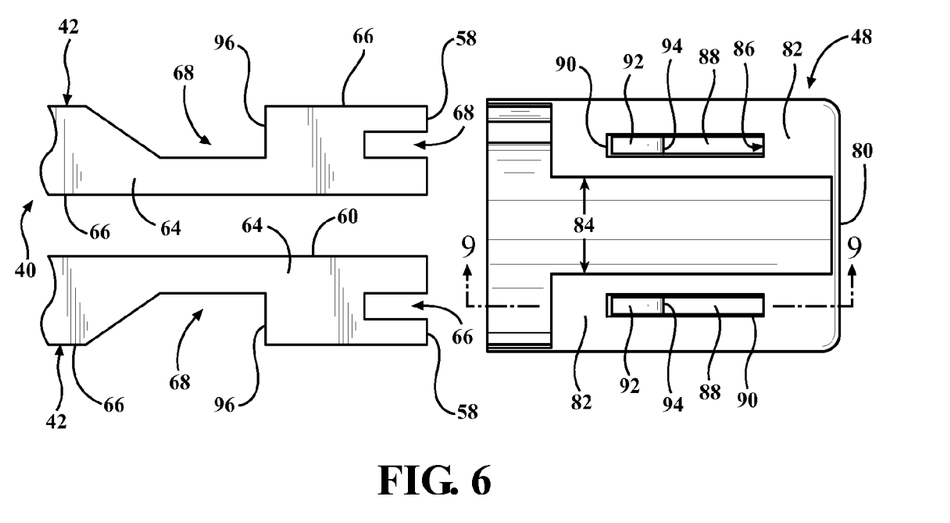
FIG. 6 is an enlarged partial bottom view of a pair of splines and the end cap of FIG. 4 in a pre-assembly configuration, according to one embodiment of the present invention.

As shown best in FIGS. 3 and 6, the support member 40 of the present invention is formed as a pair of splines 42 (sometimes referred to in the art as a "twin rail" blade design). The wiping element 38 is operatively attached to the splines 42. Specifically, the splines 42 cooperate with the grooves 56 of the wiping element 38 so as to support and retain the wiping element 38 within the wiper assembly 36. The splines 42 each have opposing longitudinal ends 58, opposing lateral sides 60, and opposing top and bottom surfaces 62, 64. These features cooperate with the end caps 48 as is discussed in greater detail below.

The splines 42 each include a first pair of notches 66 disposed at each of the opposing longitudinal ends 58. As shown best in FIG. 6, the first pair of notches 66 are substantially rectangular in shape. However, those having ordinary skill in the art will appreciate from the subsequent description of the end caps 48 that the first pair of notches 66 could have any suitable shape without departing from the scope of the present invention.

The splines 42 each also include a second pair of notches 68 disposed along one of the opposing lateral sides 60, spaced from each longitudinal end 58. As shown best in FIG. 6, the second pair of notches 68 are substantially trapezoidal in shape. However, those having ordinary skill in the art will appreciate from the subsequent description of the end caps 48 that the second pair of notches 68 could have any suitable shape without departing from the scope of the present invention. Specifically, it is conceivable that the second pair of notches 68 could be replaced with or formed as apertures (not shown, but generally known in the art) suitable to cooperate with the end caps 48 as is disused below, without departing from the scope of the present invention. Further, those having ordinary skill in the art will appreciate that the splines 42 could include an additional second pair of notches 68 disposed on both of the opposing lateral sides 60 without departing from the scope of the present invention.

Additionally, the splines 42 may include one or more securing features 70 for cooperating with the coupler 44 so as to operatively attach the support member 40 to the coupler 44. In the embodiment shown in FIG. 3, the securing features 70 are a pair of apertures formed in each of the splines 42. However, those having ordinary skill in the art will appreciate that securing features 70 could be of any suitable shape or configuration, or could be omitted entirely, without departing from the scope of the present invention. Specifically, those having ordinary skill in the art will appreciate that the coupler 44 could be fixed to the support member 40 in several different ways. By way of non-limiting example, the coupler 44 could be glued, welded, crimped, bolted, riveted, formed-over, locked, or otherwise fixed to the support member 40, without departing from the scope of the present invention As discussed above, the wiper assembly 36 also typically includes a coupler 44 operatively attached to the support member 40. In the embodiment illustrated herein, the coupler 44 is a unitary, one piece component. However, those having ordinary skill in the art will appreciate that the coupler 44 could be designed as a plurality of components that interlock or otherwise cooperate to operatively attach to the support member 40, without departing from the scope of the present invention. The coupler 44 is typically constructed from plastic and is formed using an injection molding process. However, those having ordinary skill in the art will appreciate that the coupler 44 could be constructed from any suitable material formed using any suitable process without departing from the scope of the present invention. As shown in FIG. 3, the coupler 44 includes a protruding base portion 72 and an aperture 74 disposed therein. The aperture 74 is configured to releasably and pivotally engage an adapter (not shown, but generally known in the art). Adapters are employed to releasably attach the wiper assembly 36 to one or more types of wiper arms 34. Those having ordinary skill in the art will appreciate that different vehicle OEM's employ wiper arms 34 configured to releasably attach to different adapters which are, in turn, operatively attached to a specific wiper assembly 36. By way of example, certain wiper arms 34 employed by OEM's include "bayonet-style"; "pin-type"; "hook-type"; "push-button"; "pinch-tab"; or "side-pin" connection systems of various sizes. As such, it will be appreciated that wiper arms 34 can be connected to wiper assemblies 36 in a number of different ways, using different sizes and styles of connection systems.

In one embodiment of the present invention, the wiper assembly 36 also includes at least one airfoil 46 operatively mounted to the support member 40. The airfoil 46 extends along the length of the wiper assembly 36 and acts to reduce the likelihood of wind lift by allowing air to flow over the wiper assembly 36. More specifically, and in the embodiment illustrated herein, the airfoil 46 is formed as two individual components operatively mounted to the support member 40, with the coupler 44 extending therebetween. However, those having ordinary skill in the art will appreciate that the airfoil 46 could be formed as any suitable number of individual components, or could be omitted entirely, without departing from the scope of the present invention.

The airfoil 46 is configured to a predetermined length corresponding to a particular application, and is often manufactured through an extrusion process which enables the length of the airfoil 46 to be easily adjusted without a substantial increase in manufacturing expense. However, those having ordinary skill in the art will appreciate that the airfoil 46 of the present invention could be constructed in other ways, such as by injection molding, without departing from the scope of the present invention. Furthermore, while the airfoil 46 of the present invention does not vary in size or shape along its length, it is conceivable that the airfoil 46 could be formed so as to taper or otherwise change in size or shape without departing from the scope of the present invention. Further still, while the airfoil 46 of the present invention is constructed from plastic, those having ordinary skill in the art will appreciate that the airfoil 46 could be constructed from any suitable material without departing from the scope of the present invention. Moreover, while the airfoil 46 of the present invention is extruded from a single material, those having ordinary skill in the art will appreciate that the airfoil 46 could be formed from a plurality of materials, such as by co-extrusion, over-molding, skin coating, etc., without departing from the scope of the present invention.

As shown in FIGS. 3-10, the wiper assembly 36 of the present invention also includes a pair of end caps 48. The end caps 48 are operatively mounted to each of the opposing longitudinal ends 58 of each of the pair of splines 42. The end caps 48 also provide a mass increase adjacent to the longitudinal ends 58 of the splines 42 that helps prevent localized chatter along the extremities of the wiping element 38 caused by a combination of wind lift and a decrease in the force distributed from the wiper arm 34 via the support member, as described above. End caps 48 are typically formed from plastic using an injection molding process. However, those having ordinary skill in the art will appreciate that end caps 48 could be of any suitable material, formed using any suitable process, without departing from the scope of the present invention. The end caps 48 each have a body 76, a pair of lower shelves 82, a valley 84, a pair of mounts 86, and a pair of resilient tabs 88. Each of these features will be described in greater detail below.

Figure 4:
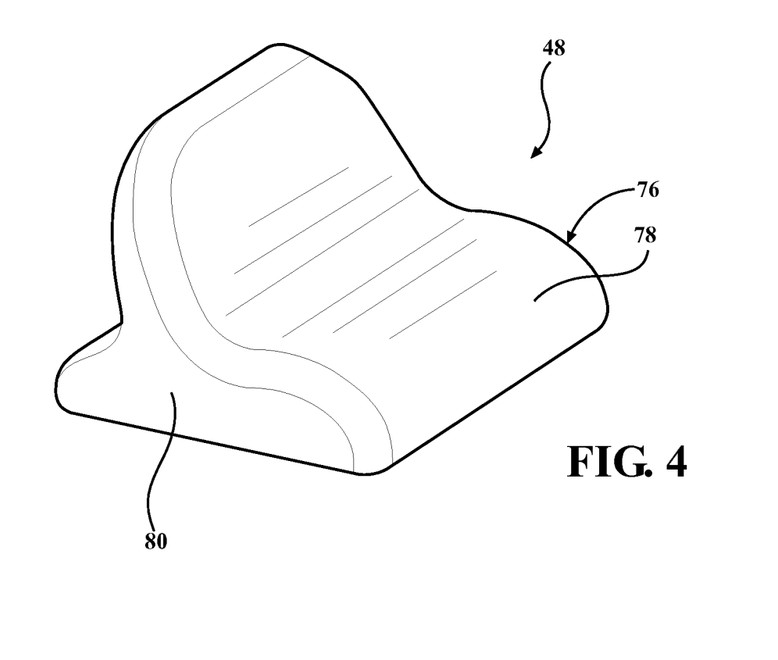
FIG. 4 is an enlarged perspective view of an end cap, according to one embodiment of the present invention, of FIG. 3.
Figure 5:
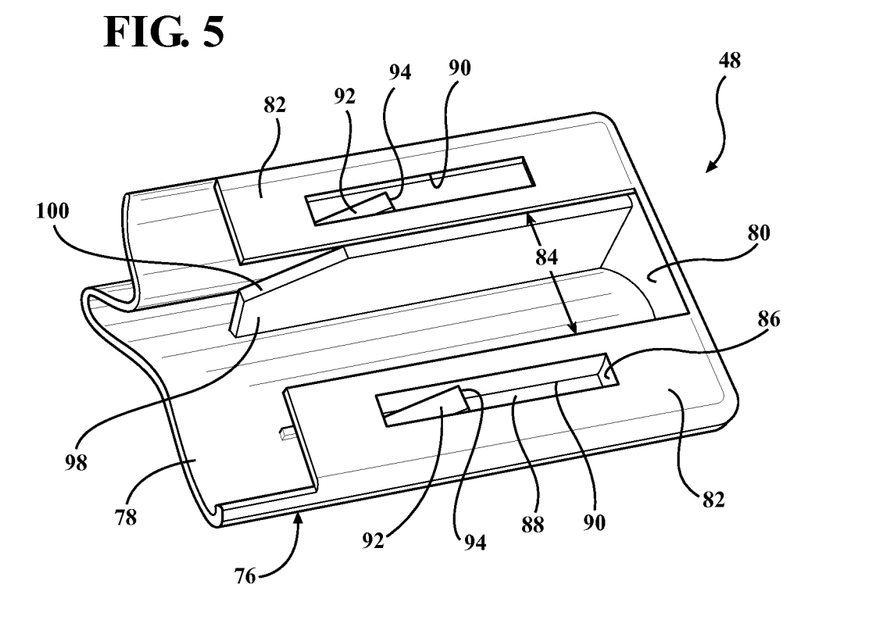
FIG. 5 is an alternate enlarged perspective view of the end cap of FIG. 4.

Referring now to FIGS. 4 and 5, the body 76 of the end caps 48 is defined by a shell 78 extending from a distal surface 80. As shown best in FIG. 4, the distal surface 80 merges with the shell 78. Further, the shell 78 of the body 76 substantially mimics the contours of the airfoil 46 so as to maintain the wind lift characteristics of the wiper assembly 36 and to provide an increased aesthetic value. However, those having ordinary skill in the art will appreciate that the body of 76 of the end caps 48 could have any suitable shape or configuration without departing from the scope of the present invention. Further, in one embodiment of the present invention, the airfoil 46 is at least partially disposed inside the body 76 of at least one of the end caps 48. Those having ordinary skill in the art will appreciate that concealing a portion of the airfoil 46 within the end cap 48 provides increased aesthetic value to the wiper assembly 36. Further, those having ordinary skill in the art will appreciate that the end caps 48 prevent the airfoil 46 from sliding off the support member 40 in operation.

Figure 7:
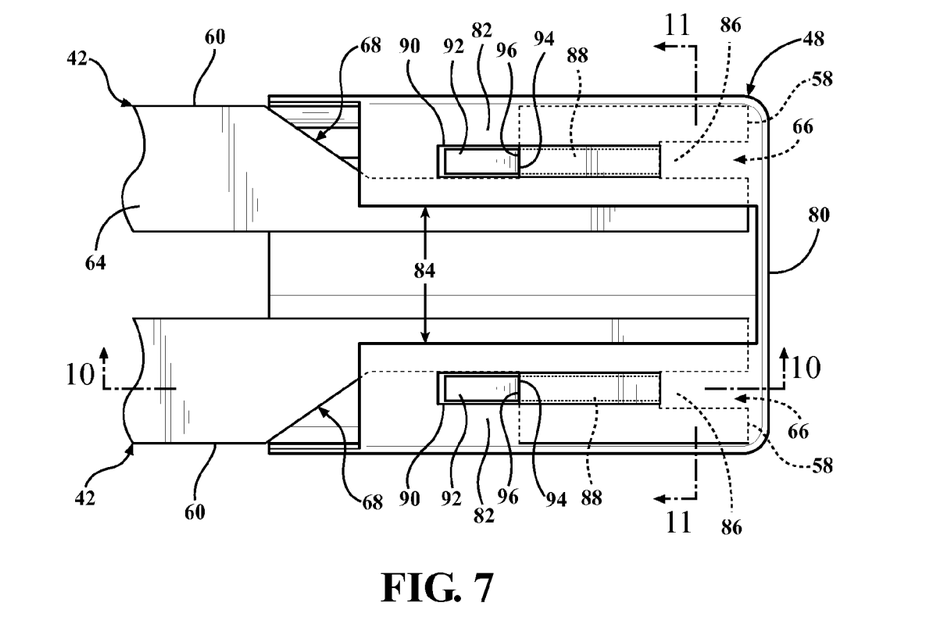
FIG. 7 is an enlarged bottom view of the splines and end cap of FIG. 6 in an assembled configuration.
Figure 8:
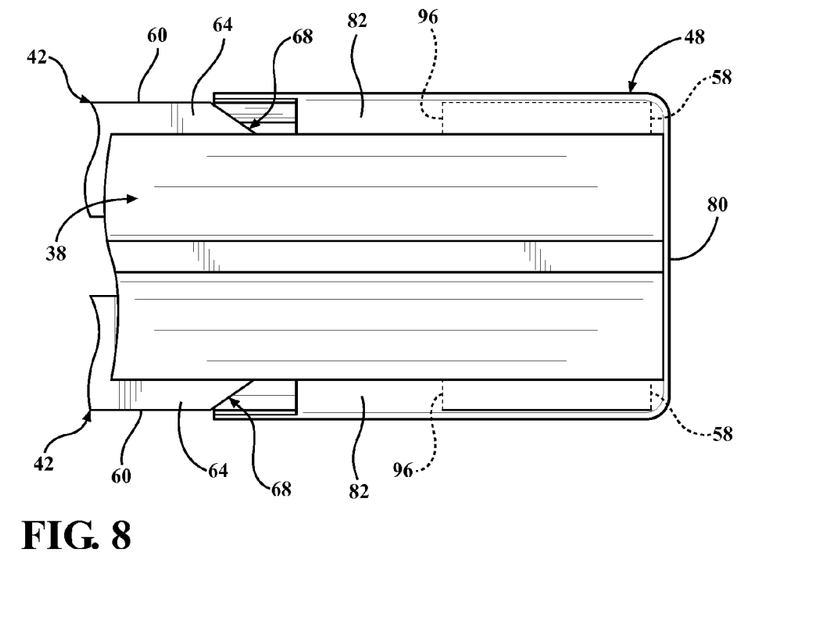
FIG. 8 is an enlarged bottom view of the splines and end cap of FIG. 7 with a wiping element installed, according to one embodiment of the present invention.

As shown best in FIGS. 6 and 7, the lower shelves 82 of the end caps 48 extend from the distal surface 80 and face each other. The shelves 82 have a generally rectangular profile and merge with the shell 78 of the body 76. However, those having ordinary skill in the art will appreciate that the shelves 82 could have any suitable profile without departing from the scope of the present invention. In one embodiment, the shelves each include an aperture 90 disposed therein. The apertures 90 are spaced from the tabs 88 and expose at least a portion of the tabs 88 therethrough (see FIGS. 6, 7, 9, and 10). The valley 84 of the end caps 48 is defined between the shelves 82 and is adapted to accommodate the wiping element 38 therein (see FIGS. 6-8).

Referring now to FIGS. 5 and 9-11, as discussed above, the end caps 48 also include a pair of mounts 86 extending from the distal surface 80 and engaging the first pair of notches 66. The mounts 86 have a generally rectangular profile that cooperates with the first pair of notches 66 so as to space the splines 42 laterally with respect to each other. While the first pair of notches 66 and the mounts 86 are shown as having a rectangular shape/profile, as discussed above, it is conceivable that the first pair of notches 66 could be configured with any suitable shape without departing from the scope of the present invention. Similarly, those having ordinary skill in the art will appreciate that the mounts 86 could be configured with any profile suitable to cooperate with the shape of the first pair of notches 66. As such, the mounts 86 and/or the first pair of notches 66 could be configured with any shape/profile suitable to cooperate so as to space the splines 42 laterally with respect to each other, without departing from the scope of the present invention.

Figure 9:
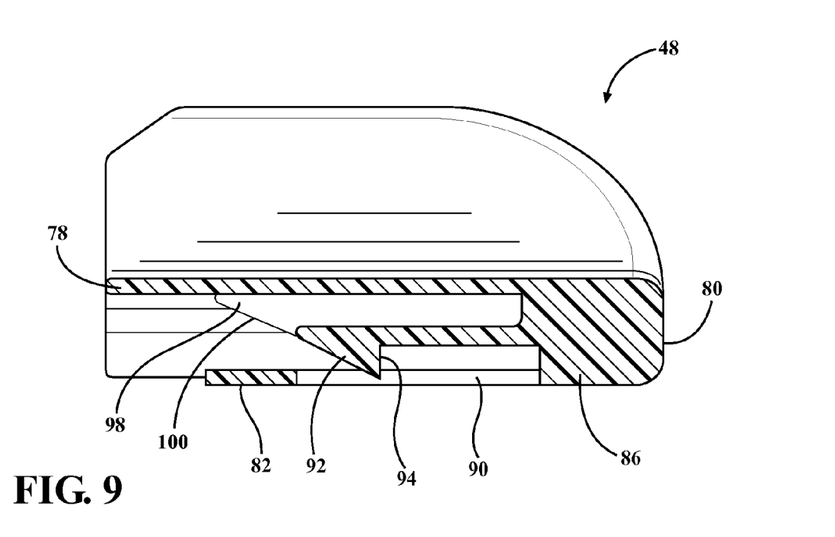
FIG. 9 is a sectional view taken along line 9-9 of FIG. 6.
Figure 10:
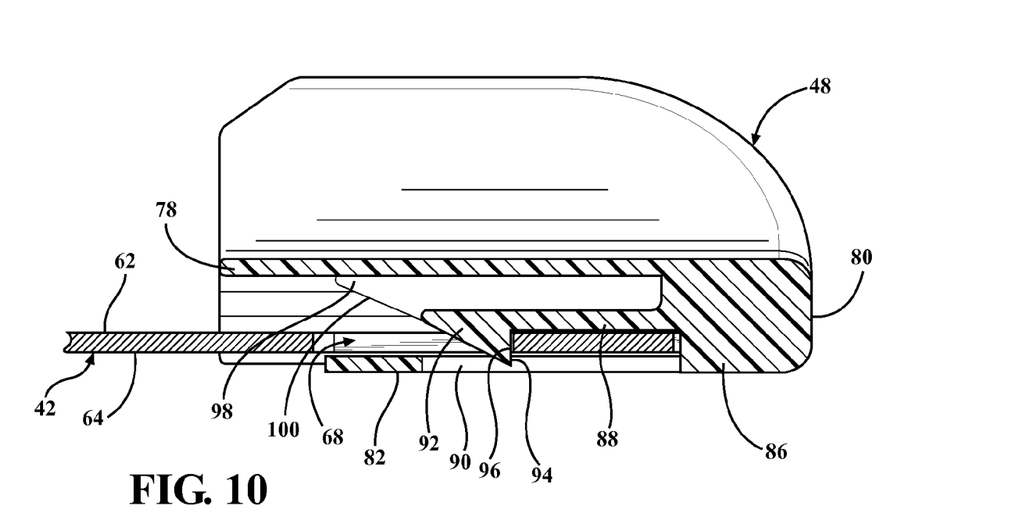
FIG. 10 is a sectional view taken along line 10-10 of FIG. 7.
Figure 11:
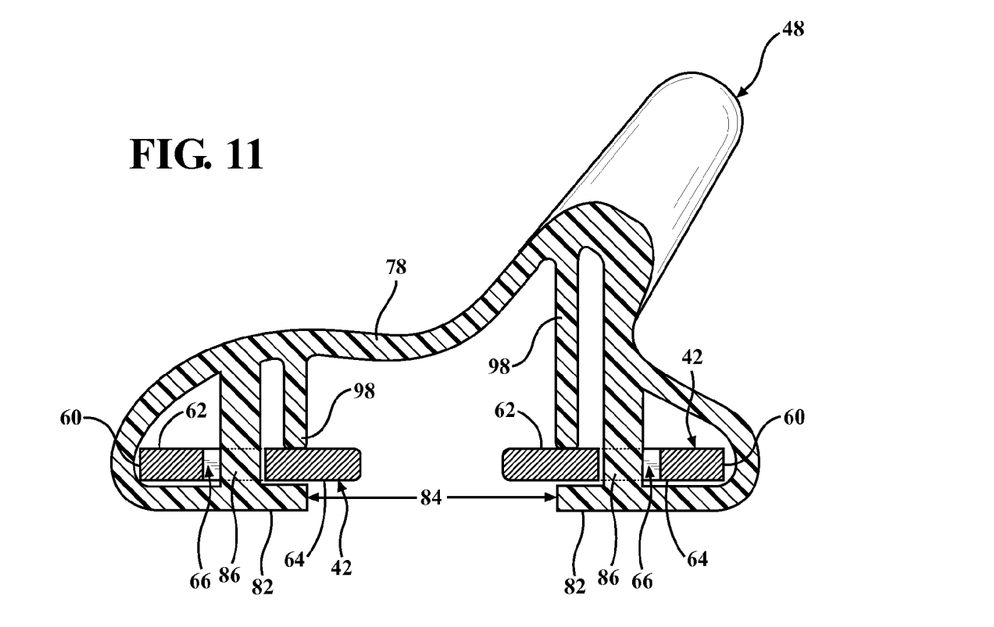
FIG. 11 is a sectional view taken along line 11-11 of FIG. 7.

As discussed above, the end caps 48 also include a pair of resilient tabs 88 extending from the mounts 86. Referring to FIGS. 9 and 10, the tabs 88 each extend to and include a downwardly-facing hook section 92 adapted to be disposed within each of the second pair of notches 68 of the splines 42, so as to operatively attach the end caps 48 to the splines 42. Specifically, in one embodiment of the present invention, the hook sections include a retention surface 94 (see FIG. 9), and the second pair of notches 68 include an interface surface 96 (see FIG. 6), with the retention surface 94 abutting the interface surface 96 when the end cap 48 is installed onto the splines 42 (see FIGS. 7 and 10). Those having ordinary skill in the art will appreciate that the interface surface 96 could be formed in any location along the second pair of notches 68, irrespective of how the second pair of notches 68 are shaped or formed, without departing from the scope of the present invention. Specifically, as mentioned previously, it is conceivable that the second pair of notches 68 could be formed as apertures (not shown, but generally known in the art), wherein the interface surface 96 would be defined by the aperture. As such, those having ordinary skill in the art will appreciate that the interface surface 96 could be formed in any location on the splines 42 suitable to cooperate with the retention surface 94 of the hook sections 92 of the end caps 48 without departing from the scope of the present invention.

Referring now to FIGS. 5 and 9-11, in one embodiment of the present invention, the end caps 48 may further include at least one rib 98 extending from the distal surface 80 and engaging the top surface 62 of one of the splines 42 when the end cap 48 is installed onto the splines 42. The rib 98 extends to and merges with the body 76 of the end cap 48 (see FIGS. 5 and 11). In the embodiment illustrated throughout the figures, the end caps 48 each include a pair of ribs 98, each of which engages a respective top surface 62 of one of the splines 42, where the ribs are spaced laterally from each other so as to accommodate the head portion 50 of the wiping element 38 therebetween.

In one embodiment of the present invention, as best shown in FIGS. 5 and 9, the rib 98 includes an angled portion 100 to guide at least one of the splines 42 into the end cap 48 during assembly. While the angled portion 100 is shown as having a linear profile, those having ordinary skill in the art will appreciate that the angled portion 100 could have any suitable profile, or could be omitted entirely, without departing from the scope of the present invention.

In this way, the mounts 86 and tabs 88 of the end caps 48 cooperate with the first pair of notches 66 and the second pair of notches 68 of the splines 42 to secure the end caps 48 to the support member 40 laterally and longitudinally. Those having ordinary skill in the art will appreciate that the end caps 48 of the present invention allow flexibility in how the wiper assembly 36 is assembled. Specifically, the end caps 48 of the present invention allow for independent or simultaneous spline 42 installation, wherein the wiping element 38 can be installed with the splines 42 or can be slid onto the splines 42 at an appropriate assembly time. By way of non-limiting example, one end cap 48 could be attached to both splines 42 and the wiping element 38 could subsequently be slid onto the splines 42 prior to the second end cap 48 being attached.

Further, the end caps 48 also provide an increased aesthetic value to the wiper assembly 36 in that the distal surface 80 merges smoothly with the shell 78. Specifically, those having ordinary skill in the art will appreciate that the structure and function of the mounts 86 and tabs 88 allow the end caps 48 to be formed with an injection molding process without necessitating the formation of mold holes or tooling marks along the distal surface 80, which would otherwise detract from the aesthetic value of the end cap 48 and, consequently, the wiper assembly 36.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A wiper assembly comprising;
an elongated wiping element adapted to contact the surface to be wiped, said wiping element having a head portion and a wiping portion;

a pair of elongated splines supporting said elongated wiping element, each of said splines having opposing longitudinal ends, opposing lateral sides, and opposing top and bottom surfaces;

a first pair of notches disposed at each of said longitudinal ends of each of said splines, said first pair of notches each being formed between and spaced laterally from said lateral sides of said splines;

a second pair of notches disposed along one of said lateral sides spaced from each longitudinal end of each of said splines; and a pair of end caps operatively mounted to each of said longitudinal ends of said pair of splines, each of said end caps having a body defined by a shell extending from a distal surface, a pair of lower shelves extending from said distal surface and facing each other, a valley defined between said shelves, a pair of mounts extending from said distal surface and engaging said first pair of notches, and a pair of resilient tabs extending from said mounts and having hook sections, said hook sections being disposed within each of said second pair of notches of said pair of splines;

and wherein said distal surface of said end cap extends laterally between said shelves adjacent to said valley and abuts said head portion of said wiping element.

2. The wiper assembly as set forth in claim 1, wherein said end caps further include at least one rib extending from said distal surface and engaging said top surface of one of said splines.

3. The wiper assembly as set forth in claim 2, wherein said rib includes an angled portion to guide at least one of said splines into said end cap during assembly.

4. The wiper assembly as set forth in claim 2, wherein said pair of end caps each include a pair of ribs extending from said distal surface and each respectively engaging said top surface of each of said splines, said pair of ribs being spaced laterally from each other so as to accommodate said head portion of said wiping element.

5. The wiper assembly as set forth in claim 1, wherein said shelves each include an aperture therein, said apertures spaced from and exposing at least a portion of said tabs.

6. The wiper assembly as set forth in claim 1, wherein said first pair of notches are substantially rectangular in shape.

7. The wiper assembly as set forth in claim 1, wherein said second pair of notches are substantially trapezoidal in shape.

8. The wiper assembly as set forth in claim 1, wherein said hook section of said pair of tabs includes a retention surface, said second pair of notches include an interface surface, with said retention surface abutting said interface surface.

9. A wiper assembly comprising;

an elongated wiping element adapted to contact the surface to be wiped, said wiping element having a head portion and a wiping portion;

a pair of elongated splines supporting said elongated wiping element, each of said splines having opposing longitudinal ends, opposing lateral sides, and opposing top and bottom surfaces;

a first pair of notches disposed at each of said longitudinal ends of each of said splines said first pair of notches each being formed between and spaced laterally from said lateral sides of said splines;

a second pair of notches disposed along one of said lateral sides spaced from each longitudinal end of each of said splines;

an airfoil operatively attached to said splines; and a pair of end caps operatively mounted to each of said longitudinal ends of said pair of splines, each of said end caps having a body defined by a shell extending from a distal surface, a pair of lower shelves extending from said distal surface and facing each other, a valley defined between said shelves, a pair of mounts extending from said distal surface and engaging said first pair of notches, and a pair of resilient tabs extending from said mounts and having hook sections, said hook sections being disposed within each of said second pair of notches of said pair of splines;

and wherein said distal surface of said end cap extends laterally between said shelves adjacent to said valley and abuts said head portion of said wiping element.

10. The wiper assembly as set forth in claim 9, wherein said pair of end caps further include at least one rib extending from said distal surface and engaging said top surface of one of said splines.

11. The wiper assembly as set forth in claim 10, wherein said rib includes an angled portion to guide at least one of said splines into said end cap during assembly.

12. The wiper assembly as set forth in claim 10, wherein said end caps each include a pair of ribs extending from said distal surface and each respectively engaging said top surface of each of said splines, said pair of ribs being spaced laterally from each other so as to accommodate said head portion of said wiping element.

13. The wiper assembly as set forth in claim 9, wherein said shelves each include an aperture therein, said apertures spaced from and exposing at least a portion of said tabs.

14. The wiper assembly as set forth in claim 9, wherein said first pair of notches are substantially rectangular in shape.

15. The wiper assembly as set forth in claim 9, wherein said second pair of notches are substantially trapezoidal in shape.

16. The wiper assembly as set forth in claim 9, wherein said hook section of said pair of tabs includes a retention surface, said second pair of notches include an interface surface, with said retention surface abutting said interface surface.

17. The wiper assembly as set forth in claim 9, wherein said airfoil is at least partially disposed inside said body of at least one of said end caps.

\* \* \* \* \*